(12) United States Patent
Nagata et al.

(10) Patent No.: US 8,238,282 B2
(45) Date of Patent: Aug. 7, 2012

(54) SYSTEM, METHOD AND COMPUTER PROGRAM FOR TRANSFERRING INFORMATION ON NETWORK

(75) Inventors: Seiji Nagata, Yokohama (JP); Shuichi Shimizu, Yokohama (JP); Tomoari Yasuda, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 1407 days.

(21) Appl. No.: 11/881,480

(22) Filed: Jul. 27, 2007

(65) Prior Publication Data

US 2008/0025242 A1  Jan. 31, 2008

(30) Foreign Application Priority Data

Jul. 31, 2006 (JP) .................. 2006-209020

(51) Int. Cl.
*H04H 20/71* (2008.01)
*H04L 12/28* (2006.01)
(52) U.S. Cl. ........................ 370/312; 370/390
(58) Field of Classification Search .............. None
See application file for complete search history.

(56) References Cited

U.S. PATENT DOCUMENTS

| | | | |
|---|---|---|---|
| 6,525,775 B1* | 2/2003 | Kahn et al. ............. | 348/460 |
| 2002/0146008 A1* | 10/2002 | Kaplan ................. | 370/390 |
| 2002/0150094 A1* | 10/2002 | Cheng et al. ........... | 370/389 |
| 2004/0157628 A1* | 8/2004 | Daniel et al. .......... | 455/466 |
| 2006/0098668 A1* | 5/2006 | Dona .................... | 370/401 |
| 2006/0168104 A1* | 7/2006 | Shimizu et al. ........ | 709/218 |
| 2006/0206408 A1* | 9/2006 | Nassiri ................. | 705/37 |
| 2007/0022042 A1* | 1/2007 | Nishi ................... | 705/37 |
| 2007/0230468 A1* | 10/2007 | Narayanan et al. ..... | 370/392 |
| 2008/0158337 A1* | 7/2008 | Richardson ........... | 348/14.09 |

OTHER PUBLICATIONS

S. Banerjee, B. Bhattacharjee, and C. Kommareddy, "Scalable application layer multicast," In Proc. ACM SIGCOMM, Aug. 2002.
Deering S., "Multicast Routing in Internetworks and Extended LANs," Proc. ACM SIGCOMM, Aug. 1988.

* cited by examiner

*Primary Examiner* — John Blanton
(74) *Attorney, Agent, or Firm* — William Stock; Anne Vachon Dougherty (57) ABSTRACT

A network system including M terminals each connected to the network, and a certain of the M terminals includes memory for storing information about the M terminals including the certain terminal in a manner that each of the M terminals is associated with one of N groups (N<M). Upon receiving first information from a different terminal, the certain terminal selects a group to which second information is to be transmitted, out of the N groups on the basis of the group associated with the different terminal, selects a terminal, to which the second information is to be transmitted, out of the terminals associated with the selected group and transmits the second information to the selected terminal.

24 Claims, 10 Drawing Sheets

| | |
|---|---|
| G1j: | 101j, 102j (10j) |
| G2j: | 101i, 102i (10i) |
| G3j: | — |
| G4j: | 101f, 102f (10f) |
| | (10g) |
| | 101h, 102h (10h) |
| G5j: | 101a, 102a (10a) |
| | (10b) |
| | (10c) |
| | 101d, 102d (10d) |
| | 101e, 102e (10e) |

| BID INFORMATION | DESTINATION GROUP | (SOURCE ADDRESS) | BID PRICE | BIDDER |
|---|---|---|---|---|
| (a) | G2j G3j G4j | 101b | $10,000 | B |
| (b1) | G2j G3j | 101h | $12,000 | H |
| (b2) | G2j G3j | 101h | $9,000 | H |

| VOTE INFORMATION | DESTINATION GROUP | (SOURCE ADDRESS) | (NUMBER OF ACQUIRED VOTES, CANDIDATE) |
|---|---|---|---|
| (a1) | G2j | 101j | (8,X) , (3,Y) |
| (b1) | G3j | 101j | (2,X) |
| (c1) | G4j | 101j | (1,Y) |

⋮ ⋮ ⋮ ⋮

(B)

| (a2) | G2j | 101j | (9,X) , (3,Y) |
|---|---|---|---|
| (b2) | G3j | 101j | (3,X) |
| (c2) | G4j | 101j | (1,X) , (1,Y) |

FIG. 14

SYSTEM, METHOD AND COMPUTER PROGRAM FOR TRANSFERRING INFORMATION ON NETWORK

FIELD OF THE INVENTION

The present invention relates to a multicast technology on a network.

BACKGROUND OF THE INVENTION

Since a conventional application layer multicast method, as detailed in Deering S., "Multicast Routing in Internetworks and Extended LANs," Proc. ACM SIGCOMM, August 1988, aims to build a low-latency delivery path for a fixed route, this method is not applicable to multicast having an arbitrary node as a source.

On the other hand, in an IP multicast technique utilizing a network device which achieves network-layer multicast, such as the one shown by S. Banerjee, B. Bhattacharjee, and C. Kommareddy, in "Scalable application layer multicast," In Proc. ACM SIGCOMM, August 2002, a network device such as a router is needed, and costs for introducing such a device is high.

In addition, this technique does not implement a function of reducing data amount by integrating data transmitted from a plurality of sources. As a result, scalability of an application for a mutual collective notification is not secured.

It is, therefore, an object of the invention to achieve scalable, reliable, and low-latency multicast at low cost.

SUMMARY OF THE INVENTION

The present invention is a network system including M terminals, each of which is connected to the network, and a certain terminal thereof is provided with storage means for storing the M terminals including the certain terminal, in association with N groups (N: N<M); reception means for receiving first information from a different terminal; group selection means for selecting a group, to which second information is transmitted, out of the N groups on the basis of a group associated with the different terminal; terminal selection means for selecting a terminal, to which the second information is transmitted, out of the terminals associated with the selected group; and transmission means for transmitting the second information to the selected terminal.

In addition, the present invention is performed by each of terminals of a network system including the M terminals, each of which is connected to the network, so as to cause a certain terminal to achieve a storage function of storing addresses of the respective M terminals including the certain terminal, in association with N groups (N: N<M); a reception function of receiving first information from a different terminal; a group selection function of selecting a group, to which second information is transmitted, out of the N groups on the basis of the group associated with the different terminal; a terminal selection function of selecting a terminal, to which the second information is transmitted, out of the terminals associated with the selected group; and a transmission function of transmitting the second information to the selected terminal.

In addition, the present invention is a method to be applied to a network system including M terminals, each of which is connected to the network. The method includes, in a certain terminal included in the network, a step of storing addresses of the M terminals including the certain terminal, in association with N groups (N: N<M); a step of receiving first information from a different terminal; a first selection step of selecting a group, to which second information is transmitted, out of the N groups on the basis of the group associated with the different terminal; a second selection step of selecting a terminal, to which the second information is transmitted, out of the terminals associated with the selected group; and a step of transmitting the second information to the selected terminal.

In addition, the present invention is a method to be applied to an existing network system including M terminals, each of which is connected to the network. The method causes a certain terminal of the network to achieve a storage function of storing the M terminals including the certain terminal, in association with N groups (N: N<M); a reception function of receiving first information from a different terminal; a group selection function of selecting a terminal, to which second information is transmitted, out of the N groups on the basis of the group associated with the different terminal; a terminal selection function of selecting a terminal, to which the second information is transmitted, out of the terminals associated with the selected group; and a transmission function of transmitting the second information to the selected terminal.

BRIEF DESCRIPTION OF THE DRAWINGS

The invention will now be described with reference to the appended drawings wherein.

DETAILED DESCRIPTION OF THE INVENTION

Figure 1:
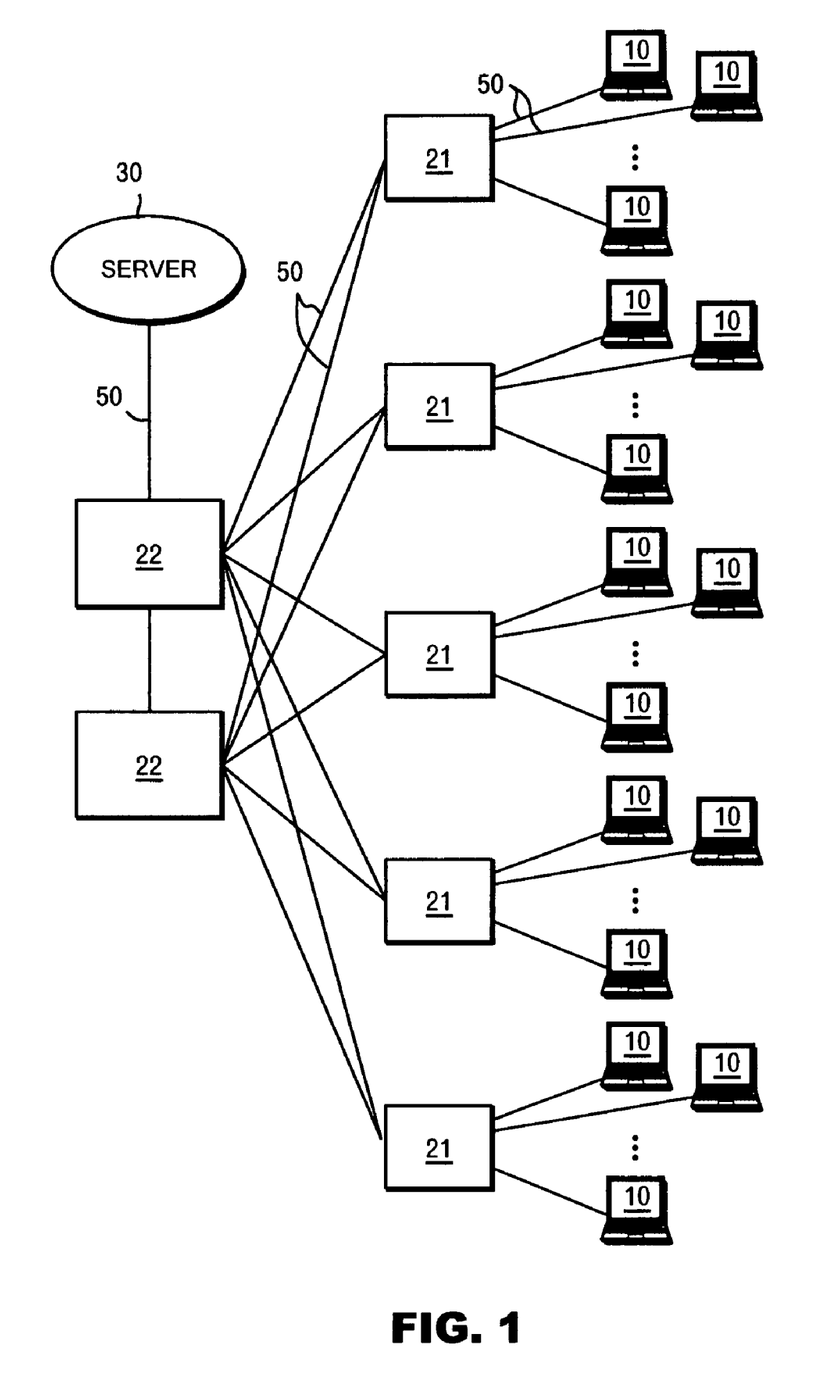
FIG. 1 is a schematic diagram illustrating a hardware configuration of a network system according to one embodiment of the present invention.

FIG. 1 is a schematic diagram illustrating a hardware configuration of a network system of one embodiment of the present invention. This network system includes an administrative server 30, a plurality of core switches 22 connected to the administrative server 30, a plurality of access switches 21 connected to each of the core switches 22, a plurality of terminals 10 connected to each of the access switches 21, and a transmission medium 50 connecting the administrative server 30 to the core switches 22, the core switches 22 to each of the access switches 21, and the access switches 21 to each of the terminal 10. The administrative server 30 and the terminals 10 can be configured by any one of various types of computer systems. For example, the terminal 10 may be a personal computer provided with a network function, a dedicated terminal, a handheld computer, a console box, a game device, a personal digital assistance (PDA), a mobile phone, an electric home appliance or a car navigation system. In addition, the transmission medium 50 may be a wired transmission medium or a wireless transmission medium. Furthermore, a part or whole of this transmission medium 50 may be configured as an intra-network or an inter-network.

Figure 2:
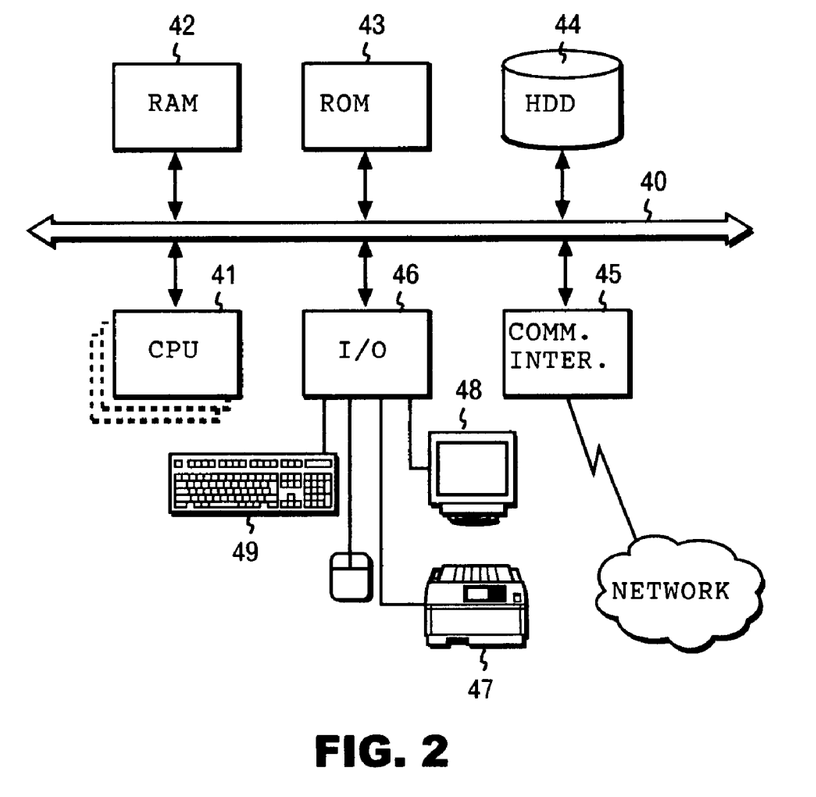
FIG. 2 illustrates a hardware configuration of a terminal 10 (herein described as a personal computer)

FIG. 2 illustrates a hardware configuration of each terminal 10 (which is described here as a personal computer). This terminal 10 is provided with a (high speed/low speed) bus 40, a central processing unit (CPU) 41 connected to the bus 40, a random access memory (RAM) 42, a read-only memory (ROM) 43, a hard disc drive (HDD) 44, a communication interface 45 and an input/output interface 46. In addition, the terminal is provided with a printer 47, a display device 48, a keyboard 49, and the like, which are connected to the input/output interface 46. If the administrative server 30 employs a personal computer architecture, the administrative server 30 has the same hardware configuration as this terminal 10. The administrative server 30 can use multiplexed CPU 41 and HDD 44 for higher data processing capability and availability.

Next, a basic software configuration of the network system according to the present invention will be described. An operating system (OS) which provides basic functions is previously installed in each of the terminals 10 and the administrative server 30. A type of OS for the terminals 10 may be the same as that for the administrative server 30. Alternatively, the type of OS for the terminals 10 may be different from that for the administrative server 30. Moreover, application software (AS) for a server is installed in the administrative server 30, and AS for a terminal is installed in each terminal 10. Here, each AS utilizes the functions of the corresponding OS.

Figure 3:
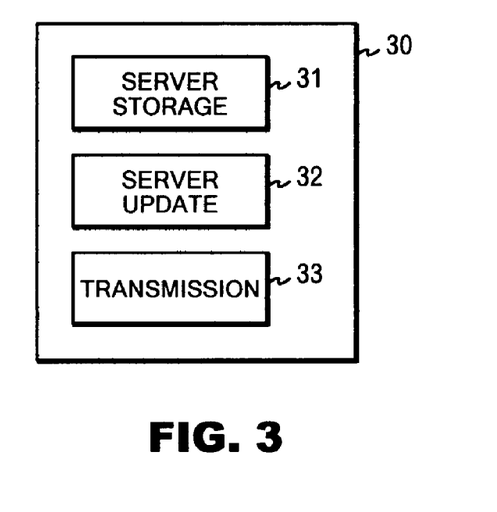
FIG. 3 is a functional block diagram of an administrative server 30.
Figure 4:
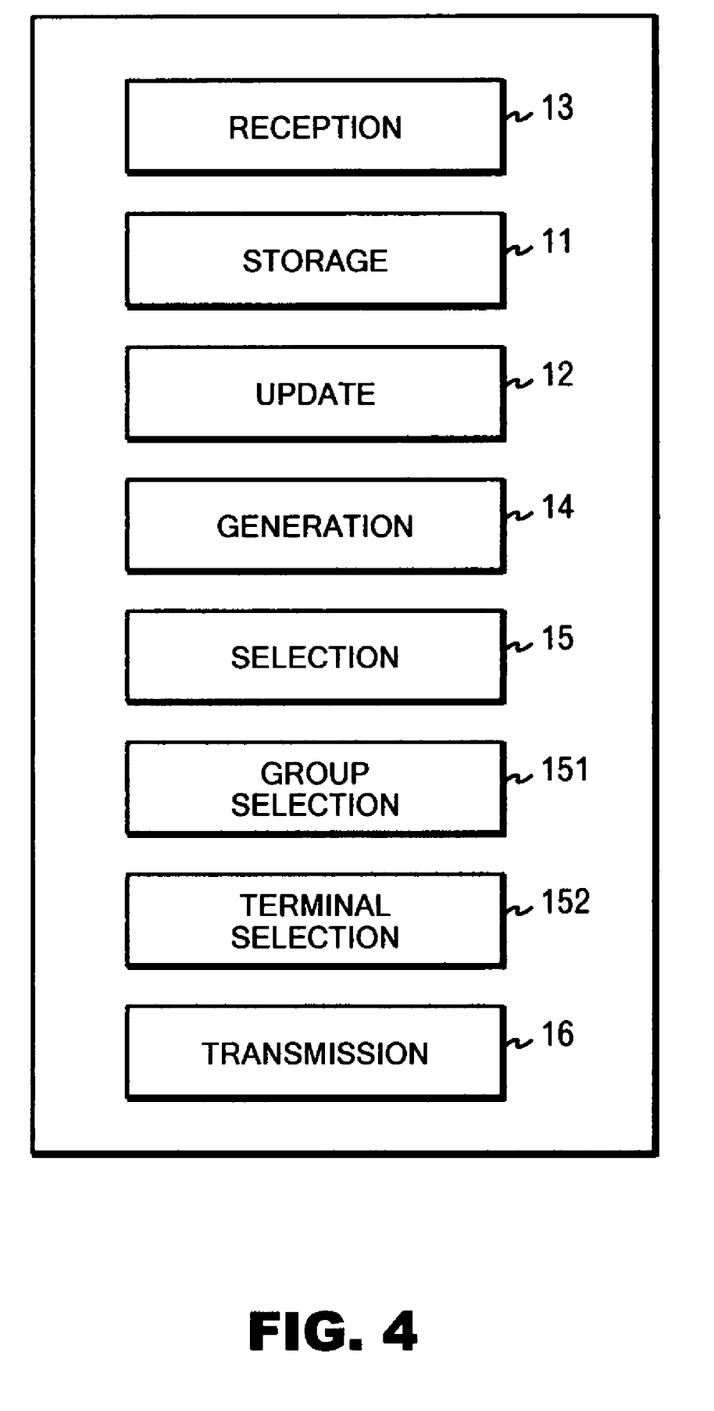
FIG. 4 is a functional block diagram of the terminal 10.

With the combination of these hardware and software configurations, the administrative server 30 and the terminals 10 operate as functional components, as described below. FIG. 3 is a functional block diagram of the administrative server 30. The administrative server 30 is provided with functional components of a server storage component 31, a server updating component 32 and a server transmission component 33. FIG. 4 is a functional block diagram of each terminal 10. The terminal 10 is provided with functional components of a storage component 11, an updating component 12, a reception component 13, a generation component 14, a selection component 15 and a transmission component 16. In addition, the selection component 15 is provided with a group selection component 151 and a terminal selection component 152.

Figure 5:
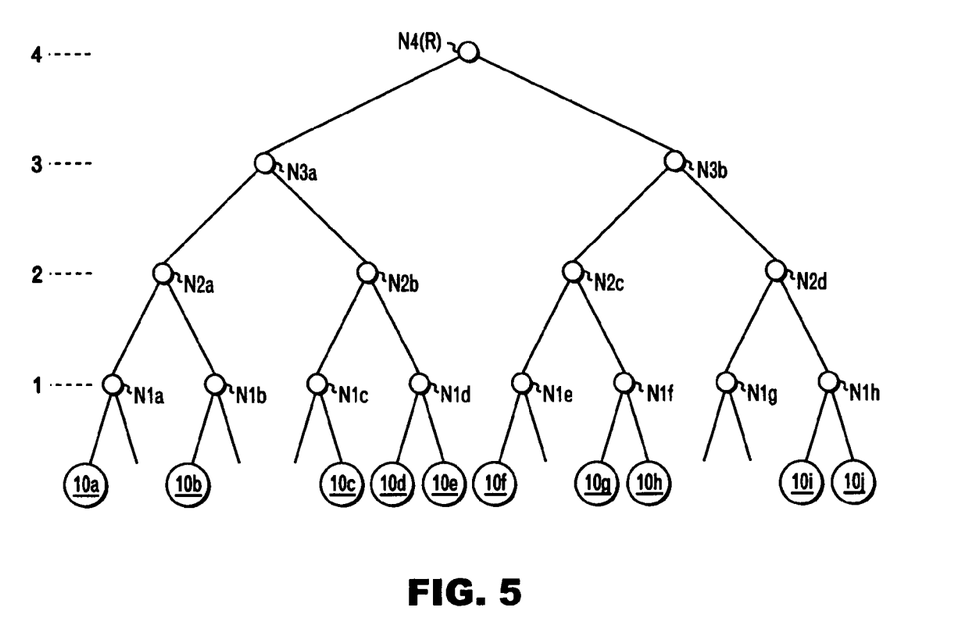
FIG. 5 schematically illustrates entire topology information stored in a server storage component 31.

The server storage component 31 of the administrative server 30 stores entire topology information. The entire topology information is information indicating addresses of the respective terminals 10, and a logical connection mode of the terminals 10 which are connected to the network system according to the present invention. FIG. 5 schematically illustrates the entire topology information stored in the server storage component 31. In the present embodiment, each of the terminals 10 is stored and administered while being associated with a certain one of leaves of a binary tree on the basis of IP addresses of the respective terminals 10. In FIG. 5, with the uppermost node being set as a node of the fourth level in a hierarchy, there exist two (two multiplied by one) nodes of the third level (N3a and N3b); four (the square of two) nodes of the second level (N2a to N2d); and eight (the cube of two) nodes of the first level (N1a to N1h). Moreover, 16 (the fourth power of two) leaves exist. Accordingly, a network topology with the maximum number of 16 terminals 10 can be expressed. In FIG. 5, 10 terminals 10a to 10j shown by circles are indicated as being included in the network system. In addition, in an actual system, a network topology with a larger number (for example, 1000 or more) of the terminals 10 can be expressed by deepening (increasing) the levels of nodes.

Figure 6:
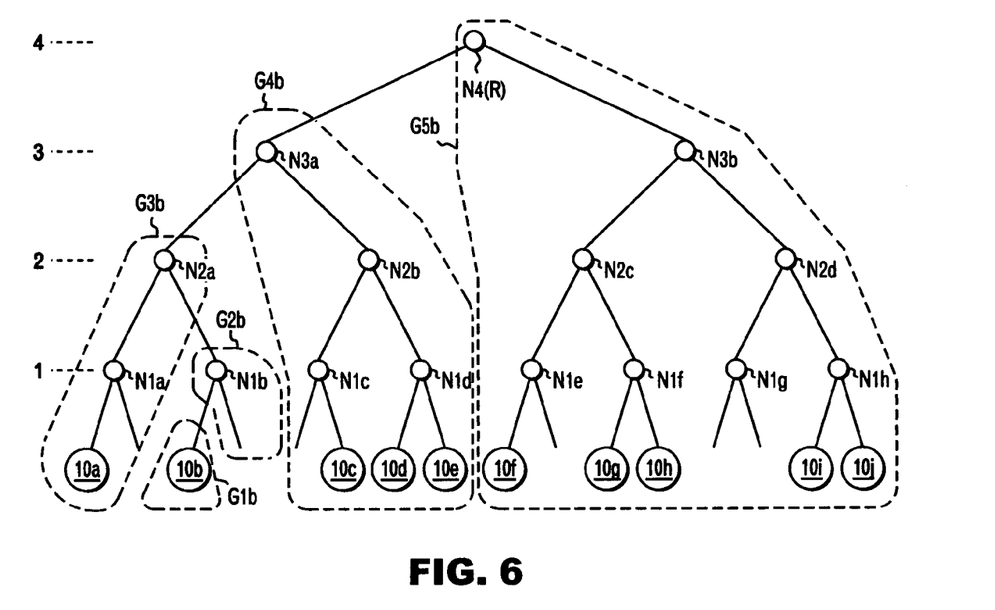
FIG. 6 is a schematic diagram showing a grouping using a terminal 10*b* as a basis.
Figure 7:
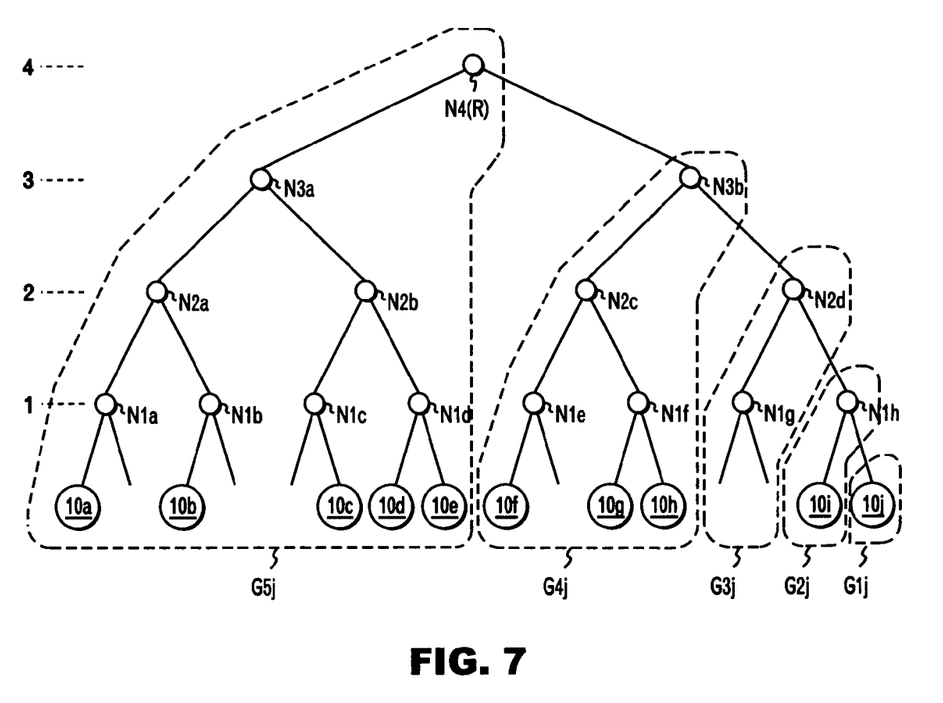
FIG. 7 is a schematic diagram showing a grouping using a terminal 10*j* as a basis.

The server storage component 31 of the administrative server 30 stores partial topology information associated with each terminal 10. The partial topology information is information indicating groups of nodes classified according to levels in the tree structure shown in FIG. 5 by using, as a basis, each terminal 10 included in the network system according to the present invention. FIG. 6 is a schematic diagram showing a grouping using the terminal 10b as a basis. The terminal 10b being set as the basis, a group which only includes a terminal 10b is set as a first group G1b; a group (except for the first group G1b) in which a node N1b in the first level is shared by terminals (in this case, no terminals exist therein) is set as a second group G2b; a group (except for the first and second groups G1b and G2b) in which a node N2b in the second level is shared by terminals (in this case, the terminal 10a) is set as a third group G3b; a group (except for the first to third groups G1b to G3b) in which a node N3a in the third level is shared by terminals (in this case, the terminals 10c, 10d and 10e) is set as a fourth group; and a group (except for the first to fourth groups G1b to G4b) in which a node N4 (that is, a root) in the fourth level is shared by terminals (in this case, the terminals 10f, 10g, 10h, 10i and 10j) is set as a fifth group G5b. Similarly, FIG. 7 is a schematic diagram showing a grouping using the terminal 10j as a basis. Similarly, the terminal 10j being set as the basis, as shown in FIG. 7, the terminals 10 can be divided into groups of first to fifth groups G1j to G5j.

Figure 8:
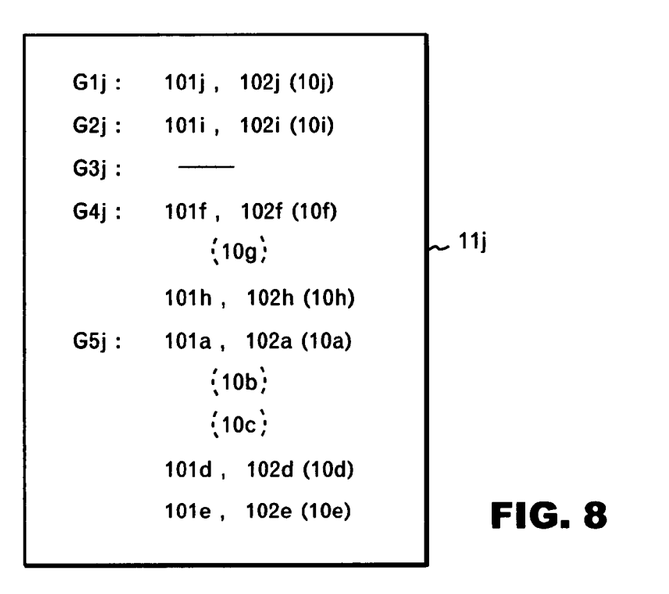
FIG. 8 schematically illustrates partial topology information 100*j* associated with the terminal 10*j*.

FIG. 8 schematically illustrates partial topology information 100j associated with a terminal 10j. This partial topology information 100j is stored in a storage component 11j of the terminal 10j. The first group G1j corresponds to the terminal 10j, and an address 101j and a transmission history 102j thereof are stored. The second group G2j corresponds to the terminal 10i, and an address 101i and a transmission history 102i thereof are stored. There are no terminals associated with the third group. The fourth group G4j corresponds to the terminals 10f, 10g and 10h. Among these terminals, addresses 101f and 101h as well as transmission histories 102f and 102h of the respective terminals 10f and 10h are stored in the storage component 11j. The fifth group G5j corresponds to the terminals 10a, 10b, 10c, 10d and 10e. Among these terminals, addresses 101a, 101d, 101e and transmission histories 102a, 102d, and 102e of the respective terminals 10a, 10d and 10e are stored in the storage component 11j.

Figure 9:
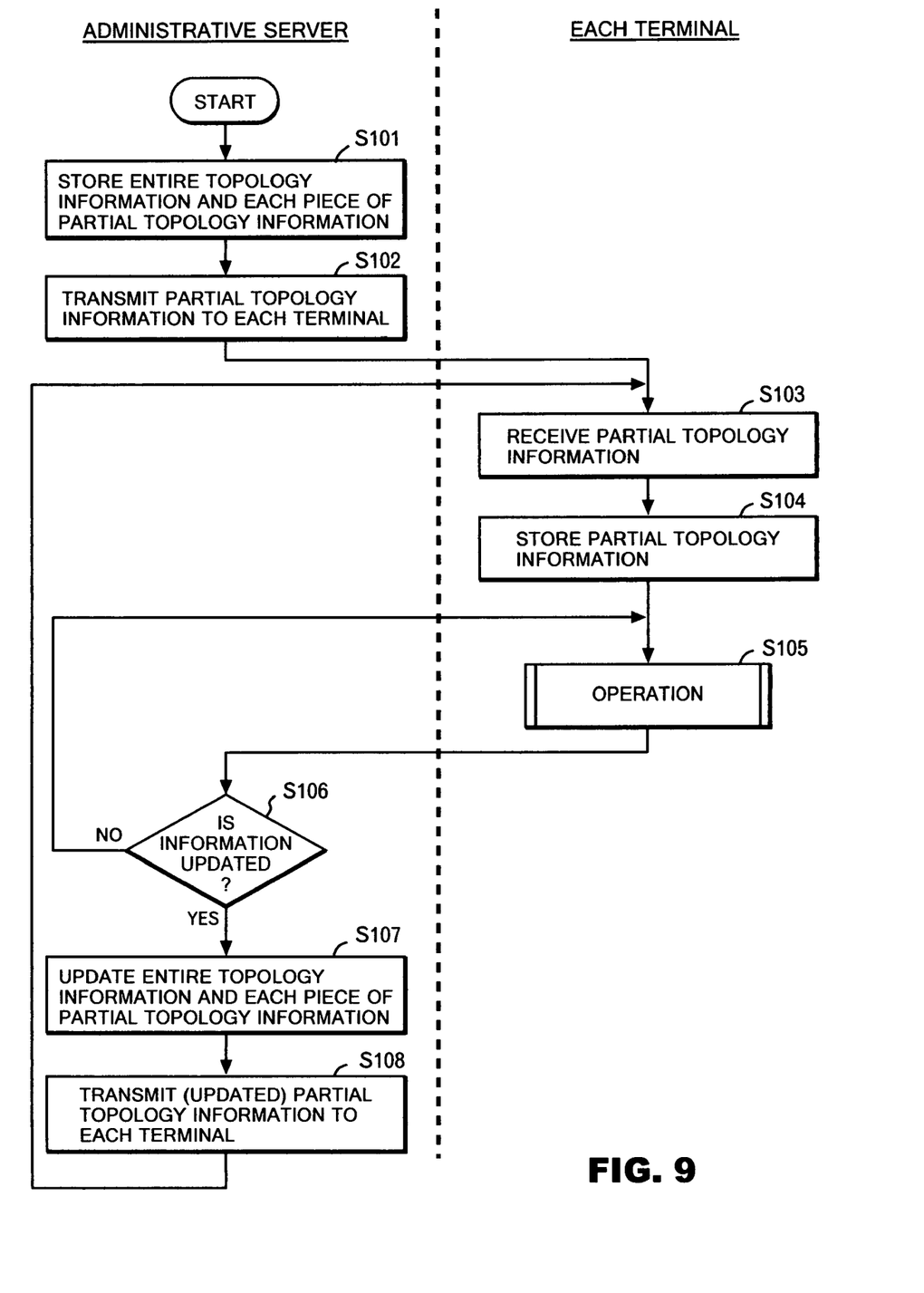
FIG. 9 is a flowchart illustrating an operational status of the network system according to the present embodiment.

FIG. 9 is a flowchart illustrating an operational status of the network system according to the present embodiment. As an initial status, the server storage component 31 stores the above-described entire topology information and partial topology information respectively associated with the terminals 10a to 10j (S101). Next, the server transmission component 33 transmits the partial topology information to the corresponding terminals 10a to 10j (S102). For example, the partial topology information is transmitted to the terminal 10b, and the partial topology information is transmitted to the terminal 10j.

Next, the reception components 13 of the terminals 10a to 10j respectively receive the partial topology information (S103). The terminals 10a to 10j respectively store the received partial topology information (S104). For example, the partial topology information is stored in the storage component 11b of the terminal 10b, and the partial topology information is stored in the storage component 11j of the terminal 10j. Then, each terminal 10 performs an operation of the network system (S105). The detailed description of this operation (S105) will be given later. The server updating component 32 of the administrative server 30 monitors whether or not the configuration of the network system is updated (S106). Specifically, the server updating component 32 monitors whether or not a new terminal 10 is logged in the network system, and whether or not an existing terminal 10 is logged off. When the network system is updated, the server updating component 32 updates the entire topology information and the partial topology information respectively associated with the terminals 10a to 10j (S107). Then, the server transmission component 33 transmits the (updated) partial topology information to the corresponding terminals 10a to 10j (S108). It is to be noted that only the updated portion of the partial topology information can be transmitted. After that, similarly, the reception components 13 of the terminals 10a to 10j respectively receive the partial topology information (S103), and the updating components of the terminals 10a to 10j respectively store (update) the partial topology information (S104).

Figure 10:
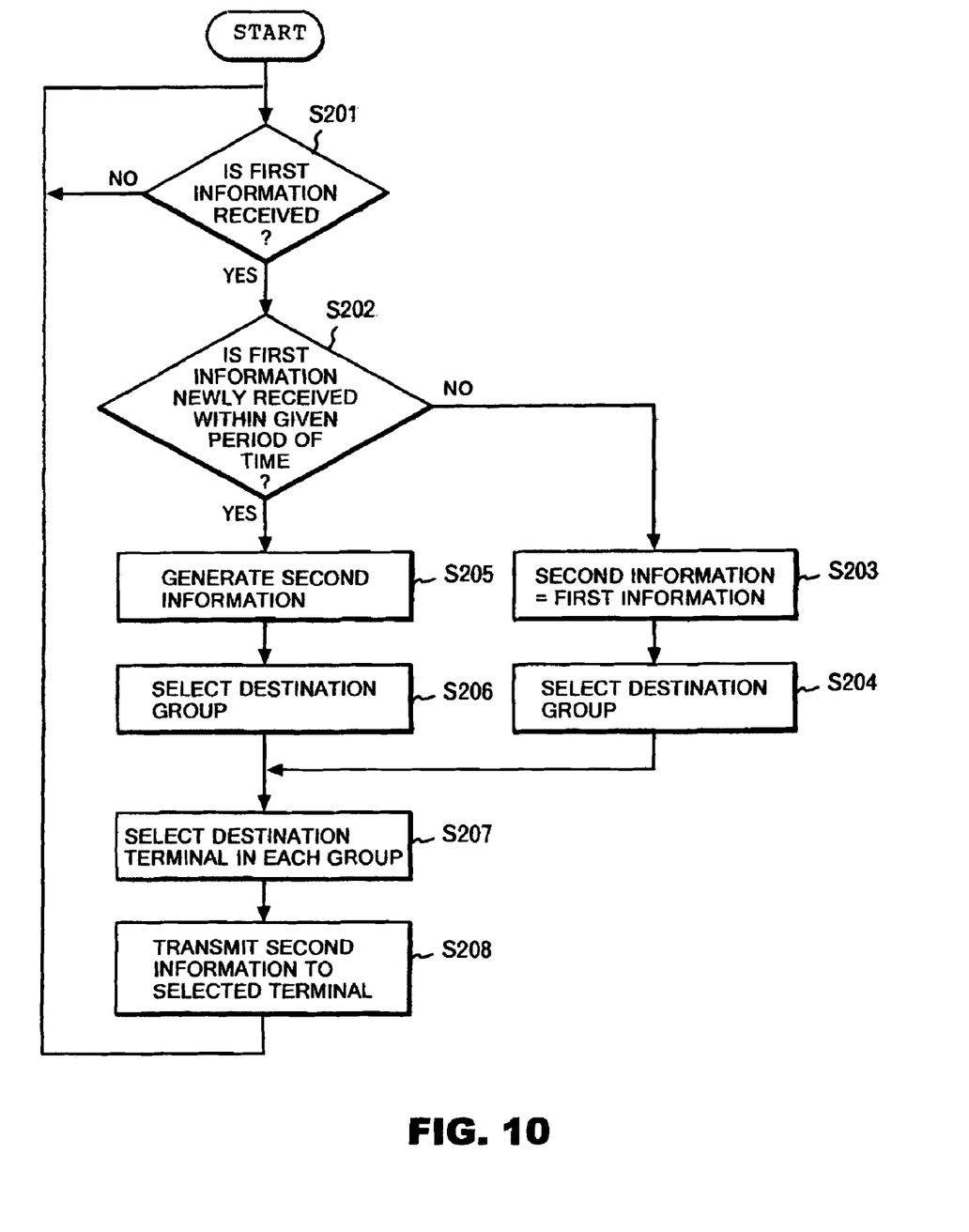
FIG. 10 is a flowchart more specifically illustrating one portion of the flowchart shown in FIG. 9.

FIG. 10 is a flowchart illustrating one portion of the flowchart in FIG. 9 in detail. The reception component 13 of each terminal 10 monitors whether or not first information is received from a different terminal (S201). When the first information is received, an elapsed time after the first information is received is measured (S202). When the first information is not newly received before the elapsed time reaches a threshold (a given period of time), the terminal 10 sets the first information to be second information (S203). Next, the group selection component 151 selects a destination group (S204). Here, the group selection component 151 can select some groups from a plurality of groups. In addition, the group selection component 151 can select a group in an intermediate level between a level of a group associated with its own terminal and a level of a group associated with the different terminal (which is a source of the first information).

On the other hand, when the first information is newly received (once or multiple times) before the elapsed time reaches the threshold (a given period of time), the generation component 14 of the terminal 10 generates second information from the plural pieces of first information (S205). Here, it is preferable that the sum of the information volumes of the plural pieces of first information be smaller than the information volume of the second information. Hence, the second information can be obtained as part of the plural pieces of first information, or can be obtained by calculating the plural pieces of first information. Next, the group selection component 151 selects a destination group (S206). Here, the group selection component 151 can select some groups from the plural groups. In addition, the group selection component 151 can select all of the groups except for the group associated with its own terminal.

Next, the terminal selection component 152 selects a destination terminal in each group (S207). Here, the terminal selection component 152 does not select a terminal when no terminals (in which the address 101 is stored) exist in the selected group. When there is only one terminal (in which the address 101 is stored) in the selected group, the terminal selection components 152 selects this terminal. Alternatively, when there are a plurality of terminals (in which the address 101 is stored) in the selected group, the terminal selection components 152 selects some (for example, one) of the plurality of terminals. When the plurality of terminals (in which the address 101 is stored) exist in the selected group, it is possible to select, on the basis of the transmission history 102, the terminal with excellent transmission results in preference to the terminals with unfavorable transmission results. The transmission component 16 transmits the second information to the selected terminal (S208).

Figure 11:
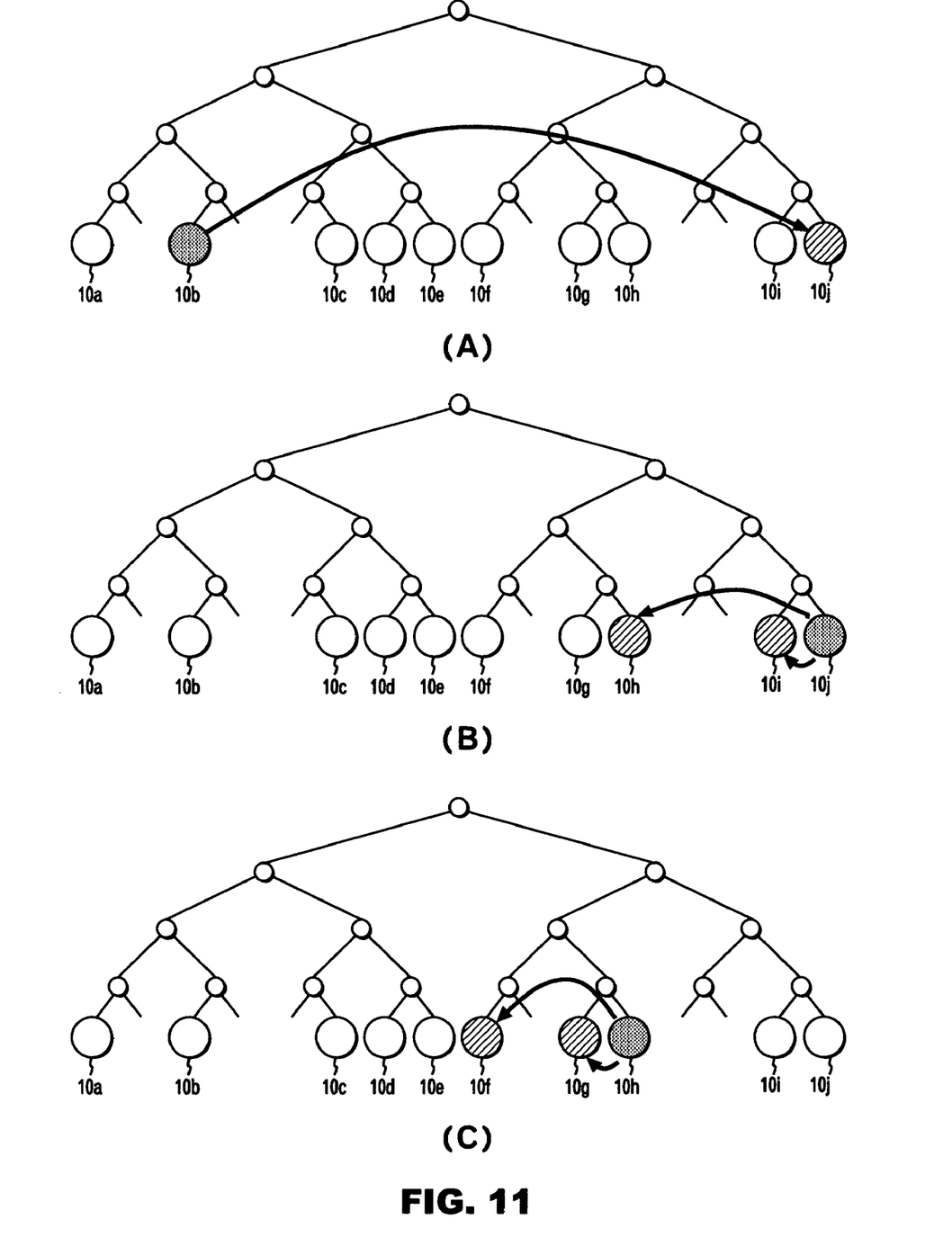
FIG. 11 is a transition diagram illustrating procedures of information delivery by the entire network system according to the present embodiment.
Figure 12:
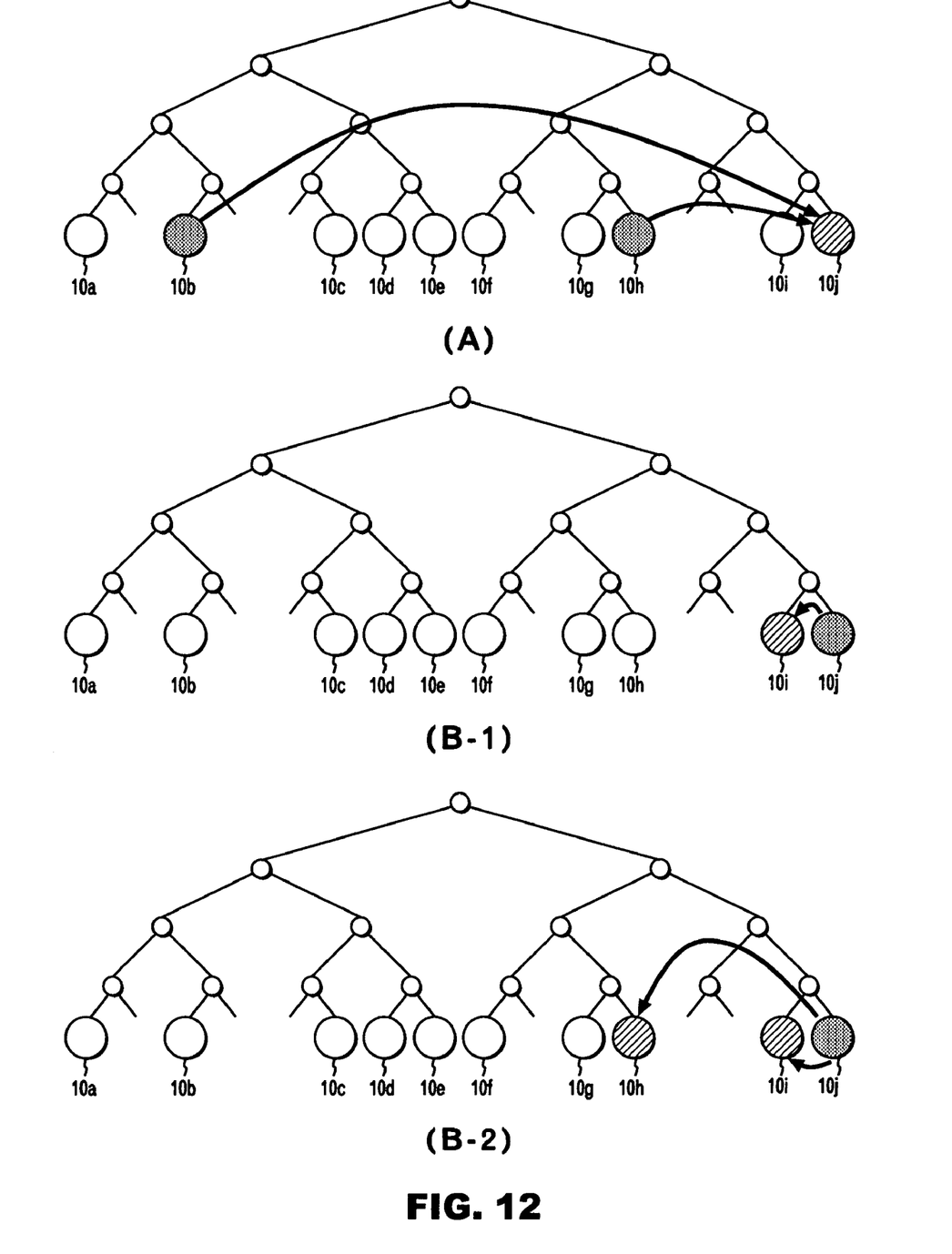
FIG. 12 is a transition diagram illustrating procedures of information delivery by the entire network system according to the present embodiment.

FIGS. 11 and 12 are transition diagrams illustrating procedures of information delivery by the entire network system according to the present embodiment. Firstly, the terminal 10b transmits information to each of the terminal 10a belonging to the third group G3b, the terminal 10d belonging to the fourth group G4b and the terminal 10j belonging to the fifth group G5b (FIG. 11A). Next, when the terminal 10j is considered, the group associated with the terminal 10b, which is the source of the information, is the fifth group G5j. Accordingly, each of the second group G2j, the third group G3j and the fourth group G4j is selected. Here, the only terminal belonging to the second group G2j is the terminal 10i. Hence, the terminal 10i is selected from the second group G2j. In addition, there are no terminals belonging to the third group G3j. Consequently, no terminal is selected from the third group G3j. Furthermore, the terminals 10f, 10g and 10h belong to the fourth group G4j. Among these terminals, addresses 101f and 101h of the terminals 10f and 10h are respectively stored therein. For this reason, any one of these terminals 10f and 10h is selected. By referring to both of the transmission histories 102f and 102h, one having excellent transmission history is selected. Here, it is assumed that the transmission history 102h is superior to the transmission history 102f. As a result, the terminal 10h is selected from the fourth group G4j. The terminal 10j transmits the information to the selected terminals 10i and 10h (FIG. 11B).

Next, the terminal 10i is considered. When viewed from the terminal 10i, the terminal 10j belongs to the second group G2i. Accordingly, no other groups exist between the first group G1j, to which the terminal 10i belongs, and the second group G2i, to which the terminal 10j belongs. As a consequence, the terminal 10i does not transmit the information. On the other hand, when viewed from the terminal 10h, the terminal 10j belongs to the fourth group G4j. Hence, the second group G2h and the third group G3h exist between the first group G1h, to which the terminal 10h belongs, and the fourth group G4h, to which the terminal 10j belongs. The only terminal belonging to the second group G2h is the terminal 10g. In addition, the only terminal belonging to the third group G3h is the terminal 10f. Accordingly, each of these terminals 10g and 10f is selected. The terminal 10h transmits the information to each of these terminals 10h and 10f (FIG. 11C).

Here, the embodiment described by using FIG. 11 is the embodiment in which the first information is set as the second information as it is (see S203 and S204 of FIG. 10). On the other hand, FIG. 12 illustrates the embodiment in which the second information is generated from the first information (see S205 and S206 of FIG. 10). If the terminal 10j receives the first information from each of the terminals 10b and 10h within a given period of time (FIG. 12A), the generation component 14 of the terminal 10j generates one piece of second information from two pieces of first information. In this case, on the basis of the obtained second information, a destination group is selected (S206 of FIG. 10). For example, according to the second information, there may be cases including those where: the second to fifth groups G1j to G5j are selected; the second to fourth groups G2j to G4j are selected; or the second and third groups G2j and G3j are selected. Next, the terminal 10 is selected from each group, and then the second information is transmitted to the selected terminals. For example, there may be a case where only the second group G2*j* is selected (FIGS. 12B-1), or where the second to fourth groups G2*j* to G4*j* are selected (FIG. 12B-2). When the terminal has an existing function which is not the latest version of the function for generating the second information, the terminal may first download a new function/version of the function prior to implementing the function.

Next, specific examples of the network system according to the present embodiment will be respectively described as examples.

In a conventional auction, an auction proceeds while information is transmitted/received as described below. Firstly, open bid information including images, descriptions and the like of a product is transmitted from an auction server to a plurality (for example, 1000 or more) of auction terminals. On the other hand, bid information including a bid price and its bidder is transmitted from the auction terminals to the auction server. The auction server sequentially transmits a bid price to each of the auction terminals.

In the present example, an auction server and a plurality of auction terminals are respectively configured as terminals 10 of the above-described network system. That is, the open bid information transmitted from the auction server is to be transmitted to a selected auction terminal in a selected group. The auction terminal sequentially transmits the received open bid information, and thereby the open bid information is finally transmitted to all of the auction terminals. It should be noted that one piece of open bid information exists for one particular product. Hence, when each auction terminal receives the open bid information (S201 of FIG. 10), it is possible to select a group (S204 of FIG. 10) and the auction terminal (S207 of FIG. 10) to which the open bid information is transmitted, without counting time elapsed after the reception of the open bid information.

On the other hand, bid information transmitted from each auction terminal is transmitted to a selected auction terminal in a selected group and to the auction server. That is, in the network system according to the present example, information is transmitted to the terminals 10 without distinguishing whether each of the terminals 10 is the auction server or the auction terminal. The auction terminal and the auction server sequentially transmit the received open bid information, and thereby the bid information is finally transmitted to all of the auction terminals and to the auction server. It should be noted that plural pieces of bid information generally exist for one particular product (since plural pieces of bid information are respectively transmitted from the plural number of people for the particular product). Hence, when each auction terminal and the auction server receive one piece of bid information (S201 of FIG. 10), time elapsed after the reception is counted. Thereafter, when different bid information is received within a given period of time, new bid information is generated (S205 of FIG. 10), and thereafter the group (S206 of FIG. 10), the auction terminal (S207 of FIG. 10) and the auction server (S207 of FIG. 10), to which the generated bid information is transmitted, can be selected.

Figure 13:
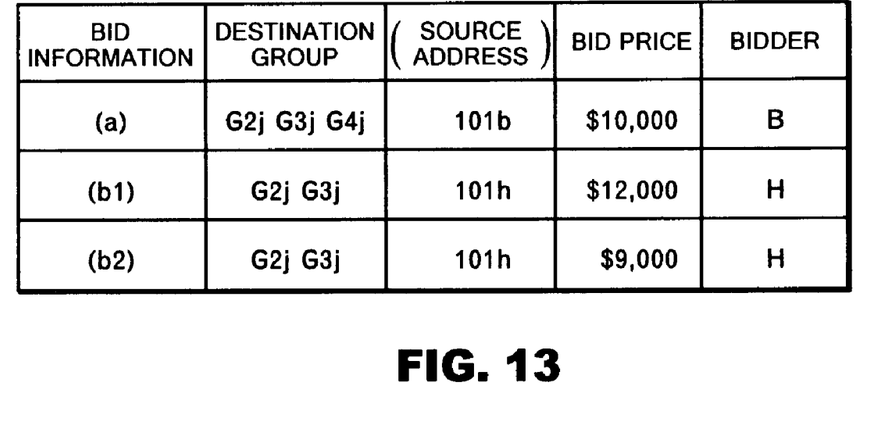
FIG. 13 illustrates bid information.

FIG. 13 illustrates bid information. In the present example, the bid information includes a destination group, a source address (optional), bid price information, and bidder information. When an auction terminal receives bid information (a) shown in FIG. 13 from a terminal, a generation component 14 of an auction terminal counts an elapsed time while holding the bid information (a) as a transmission candidate (S202 of FIG. 10).

When the auction terminal receives bid information (b1) shown in FIG. 13 from an auction terminal within a given period of time, the generation component of the auction terminal compares the bid information (a) with the bid information (b1), and then holds the bid information (b1) having a higher bid price as a transmission candidate, and discards the bid information (a) having a lower bid price. After the given period of time elapses, on the basis of the bid information (b1) of the transmission candidate which is held at this time, the group selection component 151 selects the second group G2*j* and the third group G3*j*. The terminal selection component 152 selects an auction terminal from the second group G2*j*, and does not select a terminal from the third group G3*j*. Then, the auction terminal transmits the bid information (b1) to the auction terminal (see FIG. 12B-1).

On the other hand, when the auction terminal receives bid information (b2) shown in FIG. 13 from the auction terminal within the given period of time, the generation component 14 of the auction terminal compares the bid information (a) with the bid information (b2), and then holds the bid information (a) having a higher bid price as a transmission candidate, and discards the bid information (b2) having a lower bid price. After the given period of time elapses, on the basis of the bid information (a) of the transmission candidate which is held at this time, the group selection component 151 selects the second to fourth groups G2*j*, G3*j* and G4*j*. The terminal selection component 152 selects the auction terminal from the second group G2*j*, does not select a terminal from the third group G3*j*, and selects the auction terminal from the fourth group G4*j*. Then, the auction terminal transmits the bid information (a) to each of the auction terminals (10*i* and 10*h* of FIG. 12B-2).

An electronic voting system is another example of the present invention. A vote administrative server and a plurality of voting terminals are respectively configured as terminals 10 of the above-described network system. That is, candidate information transmitted from the vote administrative server is transmitted to a selected voting terminal in each selected group. The voting terminal sequentially transmits the received candidate information, and thereby the candidate information is finally transmitted to all of the voting terminals. It should be noted that one piece of candidate information exists for one particular election. Hence, when each voting terminal receives the candidate information (S201 of FIG. 10), it is possible to select a group (S204 of FIG. 10) and the voting terminal (S207 of FIG. 10) to which the candidate information is transmitted, without counting time elapsed after the reception of the candidate information.

On the other hand, vote information transmitted from each voting terminal is transmitted to a selected voting terminal in each selected group and to the vote administrative server. That is, in the network system according to the present example, information is transmitted to the terminals 10 without distinguishing whether each of the terminals 10 is the vote administrative server or the voting terminal. The voting terminal and the vote administrative server sequentially transmit the received vote information, and thereby the vote information is finally transmitted to all of the voting terminals and to the vote administrative server. It should be noted that plural pieces of vote information generally exist for one particular election (since plural pieces of vote information are respectively transmitted from the plural number of people for the particular election). Hence, when each voting terminal and the vote administrative server receive one piece of vote information (S201 of FIG. 10), time elapsed after the reception is counted. Thereafter, when different vote information is received within a given period of time, new vote information is generated (S205 of FIG. 10), and thereafter the group (S206 of FIG. 10), the voting terminal (S207 of FIG. 10) and the vote administrative server (S207 of FIG. 10), to which the generated vote information is transmitted, can be selected.

Figure 14:
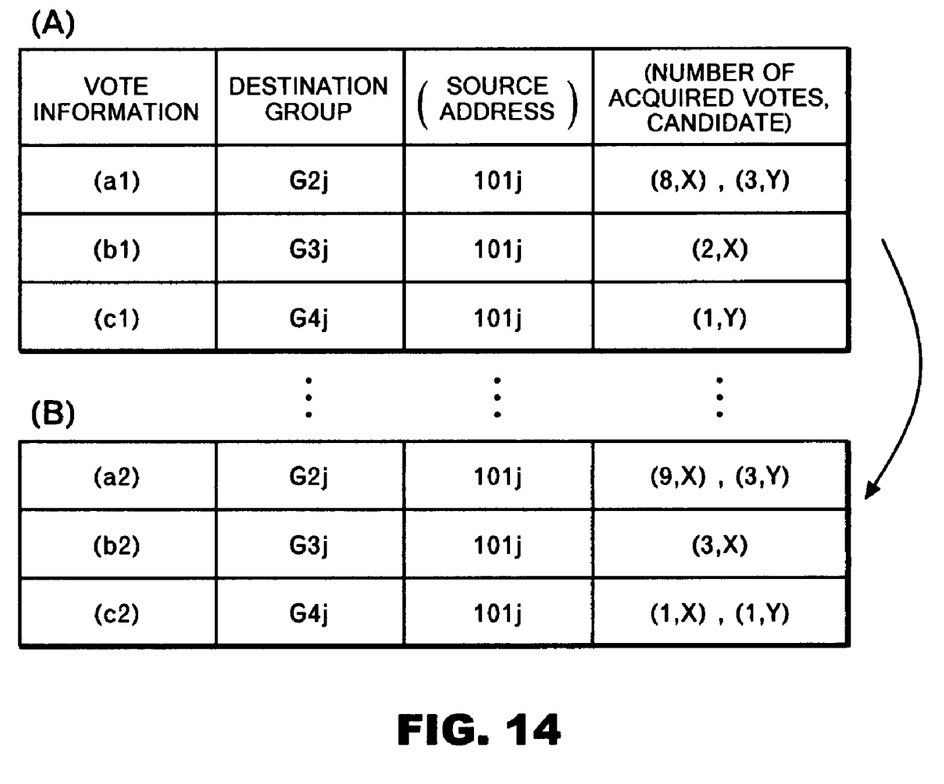
FIG. 14 illustrates vote information.

FIG. 14 illustrates vote information. In the present example, the vote information includes a destination group, a source address (optional) and a combination of a candidate and the number of votes that the candidate has acquired. FIG. 14A shows a state where a voting terminal holds vote information (a1), (b1) and (c1) as transmission candidates (S202 of FIG. 10). Specifically, the vote information (a1) to be transmitted to the voting terminal indicates that the number of acquired votes for a candidate X is 8, and that the number of acquired votes for a candidate Y is 3. The vote information (b1) to be transmitted to a voting terminal indicates that the number of acquired votes for a candidate X is 3, and that the number of acquired votes for a candidate Y is 0. The vote information (c1) to be transmitted to a different voting terminal indicates that the number of acquired votes for a candidate X is 0, and that the number of acquired votes for a candidate Y is 1.

When a vote for the candidate X is inputted to the voting terminal within a given period of time, the generation component of the voting terminal updates the held vote information. FIG. 14B shows a state where the voting terminal holds the updated vote information (a2), (b2) and (c2) as transmission candidates (S202 of FIG. 10). Specifically, the vote information (a2) to be transmitted to the voting terminal indicates that the number of acquired votes for a candidate X is 9, and that the number of acquired votes for a candidate Y is 3. The vote information (b2) to be transmitted to another voting terminal indicates that the number of acquired votes for a candidate X is 3, and that the number of acquired votes for a candidate Y is 0. The vote information (c2) to be transmitted to yet another voting terminal indicates that the number of acquired votes for a candidate X is 1, and the number of acquired votes for a candidate Y is 1.

A certain online game client can also be configured as the terminal 10 of the above-described network system. Examples of the online game, in which a different client needs to be notified of a status of the certain online game client, include a massively multiplayer online role-playing game (MMORG), an online game that is played by one player against many players (such as a Japanese chess game in which a professional chess player plays against many amateur players), and an online game that is played by many players against many players (such as a soccer game).

A measurement device can also be configured as the terminal 10 of the above-described network system. Examples of the measurement devices include a seismometer, a thermometer, a deformeter and a smoke sensor.

A traffic information device can also be configured as the terminal 10 of the above-described network system. Examples of the traffic information devices include a computer mounted on a vehicle, a traffic signal and an information collection device on a road.

The invention has been described with reference to several embodiments by way of example. Modifications can be made by one skilled in the art without departing from the spirit and scope of the invention as set forth in the appended claims.

The invention claimed is:

1. A network system comprising:
a plurality of M terminals each connected to the network, wherein a certain one of the M terminals comprises:
a terminal memory for storing relationship information about the M terminals whereby each of the M terminals is associated with one of N groups where (N<M);
a receiver for receiving at least one first information from a different terminal;
a generation component for generating second information from the at least one first information;
a group selection component for determining a group associated with the different terminal and for selecting a group, to which second information is to be transmitted, out of the N groups on the basis of the relationship information and the group associated with the different terminal;
a terminal selector for selecting a terminal, to which the second information is to be transmitted, out of the terminals associated with the selected group based on the relationship information; and
a transmitter for transmitting the second information to the selected terminal; and
an administrative server connected to the network, wherein the administrative server comprises:
server memory for storing server information about the M terminals whereby the M terminals are associated with N groups from the view point of each of the terminals, wherein the server memory in the administrative server stores server information about the M terminals in a data structure of a tree structure configured of leaves associated with the respective M terminals, and stores the server information about the M terminals in a manner that the M terminals are associated with the N groups having the hierarchy structure according to hierarchy levels of nodes each shared with each of the leaves of the tree structure; and
server transmitter for transmitting to each of the M terminals relationship information on the relationship in which the M terminals are respectively associated with the N groups, and
in the certain terminal,
the receiver receives the relationship information on a relationship in which the M terminals are respectively associated with the N groups, and
the terminal memory stores relationship information about the M terminals in association with the N groups.

2. The network system according to claim 1, wherein
the terminal memory stores information about the M terminals whereby each of the M terminals is associated with one of the N groups having a hierarchical structure, and
the group selection component selects a group, to which the second information is transmitted, on the basis of a level of a certain group associated with the certain terminal, and of a level of a different group associated with the different terminal.

3. The network system according to claim 2, wherein the group selection component selects a group in an intermediate level between the level of the certain group and the level of the different group.

4. The network system according to claim 1, wherein the group selection component selects some groups from the N groups.

5. The network system according to claim 1, wherein the group selection component selects a group other than the group associated with the different terminal, out of the N groups.

6. The network system according to claim 1, wherein
the terminal memory stores information about the M terminals as network topology information whereby each of the M terminals is associated with one of the N groups having a hierarchical structure, and pieces of the stored network topology information on the respective M terminals associated with the respective groups vary in a level of details.

7. The network system according to claim 6, wherein, in the terminal memory, a piece of network topology information on a terminal associated with a group in a level closer to the level of the certain group associated with the certain terminal is more detailed than the piece of network topology information associated with a group in a level farther away from the level of the certain group associated with the certain terminal.

8. The network system according to claim 1, wherein, in response to the fact that a plurality of terminals are associated with the selected group, the terminal selector selects some terminals out of the plurality of terminals.

9. The network system according to claim 1, wherein
the terminal memory stores the information about the terminals as well as previous transmission results for the respective terminals, in association with each other, and
in response to the fact that a plurality of terminals are associated with the selected group, the terminal selector selects a terminal with better transmission results in preference to a terminal with worse transmission results.

10. The network system according to claim 1, wherein the certain terminal further comprises a generation component for generating the second information by using plural pieces of first information received by the receiver within a preset period of time.

11. The network system according to claim 10, used for auctioning, wherein
the first information includes a bid price and its bidder, and
the generation component generates second information including a piece of first information indicating the highest bid price and its bidder, among plural pieces of first information received within the given period of time.

12. The network system according to claim 11, used for auctioning, wherein an auction server and a plurality of bidding terminals are included in the M terminals.

13. The network system according to claim 12, used for auctioning, wherein both of a dedicated terminal and a general-purpose terminal are included as the plurality of bidding terminals.

14. The network system according to claim 10, used for voting, wherein
the first information includes at least one candidate and the number of acquired votes for the candidate, and
the generation means generates second information including each candidate and the aggregated value of the acquired votes for the candidate by using plural pieces of first information received within the given period of time.

15. The network system according to claim 1, wherein
the administrative server further comprises a server updating component for updating contents stored in the server memory in response to a change in the number of terminals connected to the network, and
the certain terminal further comprises a terminal updating component for updating contents stored in the terminal memory in response to a change in the number of terminals connected to the network.

16. The network system according to claim 1, wherein, in the certain terminal, the group selection component selects a group in a lower level, the lower level comprising a level of the nodes lower than a level of a highest level node of the group associated with the address of the different terminal, out of the plurality of groups.

17. The network system according to claim 1, wherein, in the certain terminal, in response to the fact that a plurality of groups exist in a lower level of the hierarchy structure, the group selection component selects each of the plurality of groups in the lower level.

18. The network system according to claim 1, wherein,
the server memory in the administrative server stores entire network topology information on the M terminals, and
the terminal memory in the certain terminal stores part of the network topology information on the M terminals.

19. The network system according to claim 1, wherein, in the administrative server,
the tree structure is an X-ary tree, where X is a natural number of 2 or more, and
the number of terminals which can be associated with each group increases in geometric series.

20. The network system according to claim 1, wherein
each of the M terminals has an IP address, and
the server memory in the administrative server stores the IP addresses in the data structure of the tree structure.

21. A computer program stored on a non-transitory computer readable medium for execution by each of M terminals connected to a network, and included in a network system, the computer program allowing a certain one of the M terminals to achieve the functions of:
storing relationship information and addresses of the M terminals whereby each of the M terminals is associated with one of N groups where (N: N<M);
receiving at least one first information from a different terminal;
generating second information from the at least one first information;
selecting a group, to which second information is to be transmitted, out of the N groups on the basis of the group associated with the different terminal and relationship information;
selecting a terminal, to which the second information is to be transmitted, out of the terminals associated with the selected group based on relationship information;
transmitting the second information to the selected terminal;
receiving, from a server, relationship information about the M terminals in which the M terminals are respectively associated with the N groups, in a data structure of a tree structure configured of leaves associated with the respective M terminals, in a manner that the M terminals are associated with the N groups having the hierarchy structure according to hierarchy levels of nodes each shared with each of the leaves of the tree structure; and
storing relationship information received from the server.

22. A method for distributing information in a network system including M terminals each connected to the network, comprising the steps for a certain one of the M terminals of:
storing relationship information and addresses of the M terminals whereby each of the M terminals is associated with one of N groups where (N: N<M);
receiving at least one first information from a different terminal;
generating second information from the at least one first information;
selecting a group, to which second information is to be transmitted, out of the N groups on the basis of the group associated with the different terminal and relationship information;
transmitting the second information to the selected terminal;
receiving, from a server, relationship information about the M terminals in which the M terminals are respectively associated with the N groups, in a data structure of a tree structure configured of leaves associated with the respective M terminals, in a manner that the M terminals are associated with the N groups having the hierarchy structure according to hierarchy levels of nodes each shared with each of the leaves of the tree structure; and storing relationship information received from the server.

23. A method to be applied to an existing network system including M terminals each connected to the network, comprising the step of causing a certain one of the M terminals to perform the functions of:

storing relationship information and addresses of the M terminals whereby each of the M terminals is associated with one of N groups where (N: N<M);

receiving at least one first information from a different terminal;

generating second information from the at least one first information;

selecting a group, to which second information is to be transmitted, out of the N groups on the basis of the group associated with the different terminal and relationship information;

transmitting the second information to the selected terminal;

receiving, from a server, relationship information about the M terminals in which the M terminals are respectively associated with the N groups, in a data structure of a tree structure configured of leaves associated with the respective M terminals, in a manner that the M terminals are associated with the N groups having the hierarchy structure according to hierarchy levels of nodes each shared with each of the leaves of the tree structure; and storing relationship information received from the server.

24. The method according to claim 23, further comprising a step of checking an existing function and a new function of the certain terminal, prior to the step of performing the functions, installing a computer program, which achieves the new function, on the certain terminal; and implementing the new function in the certain terminal.

* * * * *